(12) United States Patent
Noguchi et al.

(10) Patent No.: US 7,161,287 B2
(45) Date of Patent: Jan. 9, 2007

(54) GREEN EMITTING YTTRIUM SILICATE PHOSPHOR AND CATHODE-RAY TUBE USING THE SAME

(75) Inventors: Yasunobu Noguchi, Naka-gun (JP); Seiji Niki, Anan (JP); Kanji Tanaka, Komatsushima (JP); Shunji Fukushima, Ibaraki (JP)

(73) Assignees: Nichia Corporation, Tokushima (JP); Matsushita Toshiba Picture Display Co., Ltd., Osaka (JP)

( * ) Notice: Subject to any disclaimer, the term of this patent is extended or adjusted under 35 U.S.C. 154(b) by 0 days.

(21) Appl. No.: 10/984,922

(22) Filed: Nov. 10, 2004

(65) Prior Publication Data
US 2006/0033418 A1    Feb. 16, 2006

(30) Foreign Application Priority Data
Nov. 12, 2003 (JP) ............... 2003/382765

(51) Int. Cl.
C09K 11/59 (2006.01)
C09K 11/77 (2006.01)
C09K 11/78 (2006.01)
C09K 11/79 (2006.01)
H01J 63/04 (2006.01)

(52) U.S. Cl. .............. 313/468; 252/301.4 R; 313/467; 313/485; 313/486; 313/495

(58) Field of Classification Search ........ 313/467–469, 313/461, 483–487, 495; 252/520.5, 301.4 R
See application file for complete search history.

(56) References Cited

U.S. PATENT DOCUMENTS

| | | | | |
|---|---|---|---|---|
| 4,914,347 A | * | 4/1990 | Osawa et al. ............... | 313/485 |
| 5,159,237 A | * | 10/1992 | Ishikawa et al. ............ | 313/486 |
| 5,177,401 A | * | 1/1993 | Matsukiyo et al. ......... | 313/468 |
| 5,714,835 A | * | 2/1998 | Zachau et al. .............. | 313/486 |
| 6,159,237 A | * | 12/2000 | Alt et al. .................... | 623/1.11 |
| 6,278,832 B1 | * | 8/2001 | Zagumennyi et al. ....... | 385/141 |
| 6,689,293 B1 | * | 2/2004 | McClellan et al. ... | 252/301.4 F |

FOREIGN PATENT DOCUMENTS

| | | |
|---|---|---|
| JP | 56-167783 | 12/1981 |
| JP | 62-260885 | 11/1987 |
| JP | 9-316444 | 12/1997 |
| JP | 10-88127 | 4/1998 |
| JP | 2002-80847 | 3/2002 |
| JP | 2003-155481 | 5/2003 |

* cited by examiner

*Primary Examiner*—Allen C. Ho
(74) *Attorney, Agent, or Firm*—Wenderoth, Lind & Ponack, L.L.P.

(57) ABSTRACT

The present invention provides a green emitting yttrium silicate phosphor, which has an improved temperature characteristic and life, and a cathode-ray tube using it. A green emitting yttrium silicate phosphor according to the present invention comprises a composition having the general composition $(Y, Sc, Tb)_2SiO_5$, wherein the mole ratio of Sc to the entire rare-earth element in the phosphor is $0.045 < Sc/(Y+Sc+Tb) < 0.17$. Adding the above concentration range of Sc improves its temperature characteristic and life. It is more preferable that the concentration range is $0.07 < Sc/(Y+Sc+Tb) < 0.13$.

12 Claims, 3 Drawing Sheets

GREEN EMITTING YTTRIUM SILICATE PHOSPHOR AND CATHODE-RAY TUBE USING THE SAME

BACKGROUND OF THE INVENTION

1. Technical Field

The present invention relates to a green emitting yttrium silicate phosphor and a cathode-ray tube using it, more particularly to a green emitting yttrium silicate phosphor, which has an improved temperature characteristic and life, and a cathode-ray tube using it.

2. Description of Related Art

In these years, cathode-ray tubes, such as a color cathode-ray tube (CRT), a projection cathode-ray tube (PRT), a field emission display (FED), and a vacuum fluorescent display (VFD), are getting to display a higher resolution image in higher brightness for responding needs. Phosphors used in these cathode-ray tubes are required to be further improved. Particularly, since a projection cathode-ray tube projects and displays an enlarged image, a higher brightness is required compared with a direct-view tube, and a high voltage and a high current are applied thereto. Accordingly, phosphors, which have good characteristics, such as a high resistance against high load, a brightness saturation characteristic, a temperature characteristic and its life, are necessary. Among phosphors, since a green emitting phosphor highly contributes to white, requirements on it is also high, and various phosphors have been studied.

Hereafter, a projection cathode-ray tube is described as an example of a typical cathode-ray tube. A projection type television displays an enlarged image composed of red, green and blue light emitted from three small monochromatic cathode-ray tubes (projection cathode-ray tubes). Since the projection cathode-ray tube is used as the light source, a fluorescence surface is subjected to double digits the load as compared with a direct-view-type cathode-ray tube. For this reason, the following requirements exist on such a projection cathode-ray tube.

(1) High luminance efficiency,
(2) Proportional relationship between its luminance and a current density (brightness saturation characteristic),
(3) No luminance reduction as temperature rise (temperature characteristic),
(4) No time-variation of its luminance (life), and so on.

An yttrium silicate phosphor with the above characteristics is in actual use as a green emitting phosphor for projection cathode-ray tubes. However, as recently digital broadcasting becomes widespread, it is required to display a higher resolution image in higher brightness, and such a phosphor is subjected, to a higher load. Accordingly, further improvement of characteristics is necessary. Particularly, an yttrium silicate phosphor has a problem, of its temperature characteristic and life. High requirements for improvement of these characteristics exist.

Although Patent Document 1 and or the like discloses improvement of the temperature characteristic and life of the yttrium silicate phosphor for the projection cathode-ray tubes, since a phosphor is subjected to a higher load in recent years, further improvement is still necessary. Although Patent Documents 2 and 3 disclose that substituting Sc for a part of phosphor composition improves luminance, the disclosed compositions do not sufficiently improve their temperature and life characteristics. Accordingly, improvement is still necessary.

Patent Document 1: Japanese Laid-Open Patent Publication TOKUKAI No. HEI 9-316444.

Patent Document 2: Japanese Laid-Open Patent Publication TOKUKAI No. SHO 56-167783.

Patent Document 3: Japanese Laid-Open Patent Publication TOKUKAI No. SHO 62-260885.

SUMMARY OF THE INVENTION

The present invention is aimed at solving the problems. It is an object of the present invention to provide a green emitting yttrium silicate phosphor, which has an improved temperature characteristic and its life, and a cathode-ray tube using it.

The inventors of the present invention have diligently studied to solve the above problems. As a result, they found that an yttrium silicate phosphor, which had particular composition, could solve the above problems, and finally developed the present invention.

A green emitting yttrium silicate phosphor according to the present invention comprises a composition having the general composition $(Y, Sc, Tb)_2SiO_5$, wherein the mole ratio of Sc to the entire rare-earth element in the phosphor is $0.045 < Sc/(Y+Sc+Tb) < 0.17$. Adding the above concentration range of Sc improves a temperature characteristic and life. It is more preferable that the concentration range is $0.07 < Sc/(Y+Sc+Tb) < 0.13$.

According to the green emitting yttrium silicate phosphor of another aspect of the present invention, the general formula is represented as follows.

$$(Y_{1-x-y}, Sc_x, Tb_y)_2SiO_5$$

$$0.045 < x < 0.17$$

$$0.05 \leq y \leq 0.17$$

In this general formula, Tb as an activation agent relates to the color of luminescent radiation, and emits green luminescent radiation. The, value y is preferably in the range $0.05 \leq y \leq 0.17$, and more preferably in the range $0.06 \leq y \leq 0.15$. If the value y is less than 0.05, the luminance of the phosphor is low. On the other hand, if the value y is greater than 0.17, the luminance is low due to concentration quenching.

In addition, adding Sc improves a temperature characteristic and life as mentioned above. The value x as the amount of Sc is preferably in the range $0.045 < x < 0.17$, and more preferably in the range $0.07 < x < 0.13$. If the value x is less than 0.045, or is greater than 0.17, the effects both on the temperature characteristic and life are reduced.

According the green emitting yttrium silicate phosphor of another aspect of the present invention, the phosphor may contain 1000 ppm or less of Ge in the phosphor. In this case, a similar effect on the temperature characteristic and life is obtained.

A cathode-ray tube according to another aspect of the present invention comprises a phosphor film, and an exciting device which irradiates the phosphor film with an electron beam, wherein the phosphor film includes the above phosphor. For example, a projection type television displays an enlarged image composed of red, green and blue light emitted from three monochromatic cathode-ray tubes. When the phosphor according to the present invention is used alone, or when a green emitting phosphor mixture containing the phosphor according to the present invention is used, as a phosphor film applied on a face plate of a green cathode-ray tube in the cathode-ray tubes, it is possible to produce a green projection cathode-ray tube with an improved temperature characteristic and life.

The green emitting yttrium silicate phosphor, according to the present invention, comprising a composition having the general composition $(Y, Sc, Tb)_2SiO_5$ whose mole ratio of Sc to the entire rare-earth element in the phosphor is $0.045 < Sc/(Y+Sc+Tb) < 0.17$ has an improved temperature characteristic and life. Particularly, it exhibits excellent characteristics as, a phosphor for a projection cathode-ray tube which is used under a high load condition. A projection cathode-ray tube employing the phosphor of the present invention can display an image in high quality.

DETAILED DESCRIPTION OF THE PREFERRED EMBODIMENTS

Figure 1:
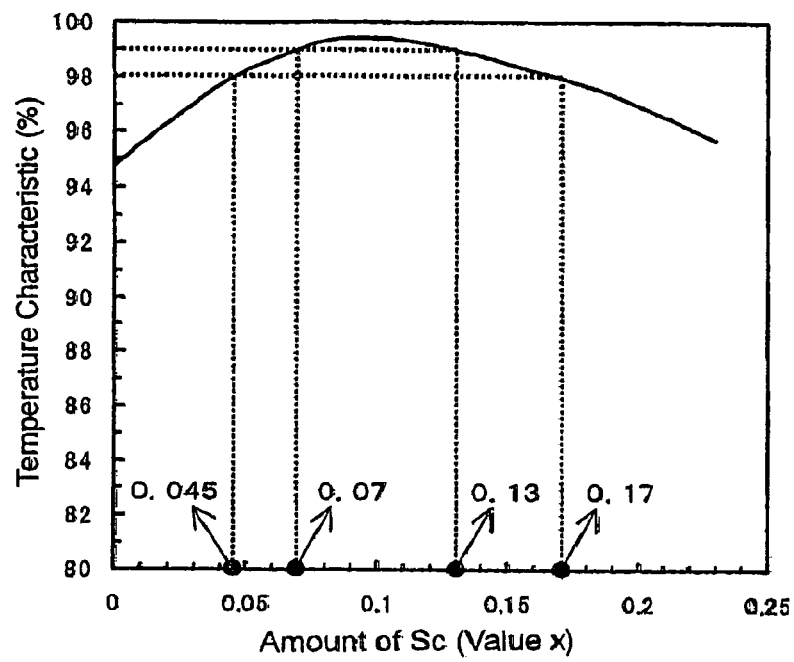
FIG. 1 is a graph showing the relation between a temperature characteristic (%) and the amount of Sc (value x)

The following description will describe the embodiments according to the present invention with reference to the drawings. It should be appreciated, however, that the embodiments described below are illustrations of a green emitting yttrium silicate phosphor and a cathode-ray tube using it, a green emitting yttrium silicate phosphor and a cathode-ray tube using it to give a concrete form to technical ideas of the invention, and a green emitting yttrium silicate phosphor and a cathode-ray tube using it of the invention are not specifically limited to description below.

Furthermore, it should be appreciated that the members shown in claims attached hereto are not specifically limited to members in the embodiments. Unless otherwise specified, any dimensions, materials, shapes and relative arrangements of the parts described in the embodiments are given as an example and not as a limitation. Additionally, the sizes and the arrangement relationships of the members in each of drawings are occasionally shown larger exaggeratingly for ease of explanation. Members same as or similar to those of this invention are attached with the same designation and the same reference numerals and their description is omitted. In addition, a plurality of structural elements of the present invention may be configured as a single part which serves the purpose of a plurality of elements, on the other hand, a single structural element may be configured as a plurality of parts which serve the purpose of a single element.

A method for producing of an yttrium silicate phosphor according to the embodiments of the present invention is now described. First, an yttrium compound, a scandium compound, a terbium compound, and a silicon compound are measured, respectively, so that the amount of Y, the amount of Sc, the amount of Tb, and the amount of Si in a material mixture satisfy the general formula $(Y_{1-x-y}, Sc_x, Tb_y)_2SiO_5$ $(0.045 < x < 0.17,$ and $0.05 \leq y \leq 0.17)$. Subsequently, they are mixed, or mixed additionally with a flux such as ammonium fluoride. After this material mixture is filled in a crucible, it is placed in a furnace and burned at the temperature 1100 to 1650° C. in a reducing atmosphere. After the burned material is cooled, and dispersed by a wet process, it is separated and dried. Finally, the yttrium silicate phosphor according to, the embodiments of the present invention is obtained.

An oxide or a compound, which becomes into an oxide by thermal decomposition, is preferably used as a phosphor material. For example, an oxide, a carbonate, a hydroxide, and so on, are preferably used as the yttrium compound, the scandium compound, and a terbium compound. A coprecipitated material, which contains all of, or some of Y, Sc, and Tb, or an oxide, which is obtained by calcination of such a material, can be used. Compounds, such as a silicon dioxide are preferably used as a silicon compound. In addition, in order to substitute a part of silicon in the phosphor with germanium that is congener to silicon, optionally, a germanium compound is used together with a silicon compound for mixture. In this case, a similar effect on the temperature characteristic and life is obtained. A typical process such as mixture atmosphere nitrogen and hydrogen is used as the reducing atmosphere, for example.

FIG. 1 shows the relation between a temperature characteristic (%) and the amount of Sc (value x) of a phosphor $(Y_{0.91-x}, Sc_x, Tb_{0.09})_2SiO_5$ according to the embodiments of the present invention. The temperature characteristic (%) is relative luminance (%) at 150° C. where the luminance at a room temperature is defined as 100%, and is calculated based on luminance at 150° C. and luminance at a room temperature, which are obtained by measuring a measurement cell with the phosphor filled therein by means of a demountable apparatus. Luminance is measured by irradiating a phosphor with an electron beam at an acceleration voltage of 10 kV and a current density of 0.5 µA/cm². It is generally said that, when a projection cathode-ray tube is turned on continuously, the phosphor temperature of a lighting portion thereof reaches 150° C. When a projection cathode-ray tube is actually used, parts corresponding to high temperature rise and parts corresponding to low temperature rise coexist in the phosphor of the lighting portion, due to switching images. In this case, when the difference of the luminance values due to the difference of temperatures is large, a user notices it as luminance unevenness. This greatly reduces image quality. It is generally said that humans can notice the difference of the luminance values between two parts adjacent to each other with their naked eyes when the difference is 2% or more. Accordingly, it is preferable that the temperature characteristic is 98% or more. FIG. 1 shows that the temperature characteristics are low in the case where the amount of Sc (value x) is 0.045 or less and 0.17 or more, and are improved to 98% or more in the range $0.045 < x < 0.17$ Especially, the temperature characteristics are improved to 99% or more in the range $0.07 < x < 0.13$, and the phosphor in this range exhibits very excellent characteristics. Accordingly, this figure shows that it is very effective for a phosphor for projection cathode-ray tubes. In this case, though the case where the amount of Tb (value y) is 0.09 is shown, similar results are obtained in the cases other than this value. In the case where the value y is $0.05 \leq y \leq 0.17$, the luminance is high in the range $0.045 < x < 0.17$, and a phosphor with an excellent temperature characteristic is obtained.

Figure 2:
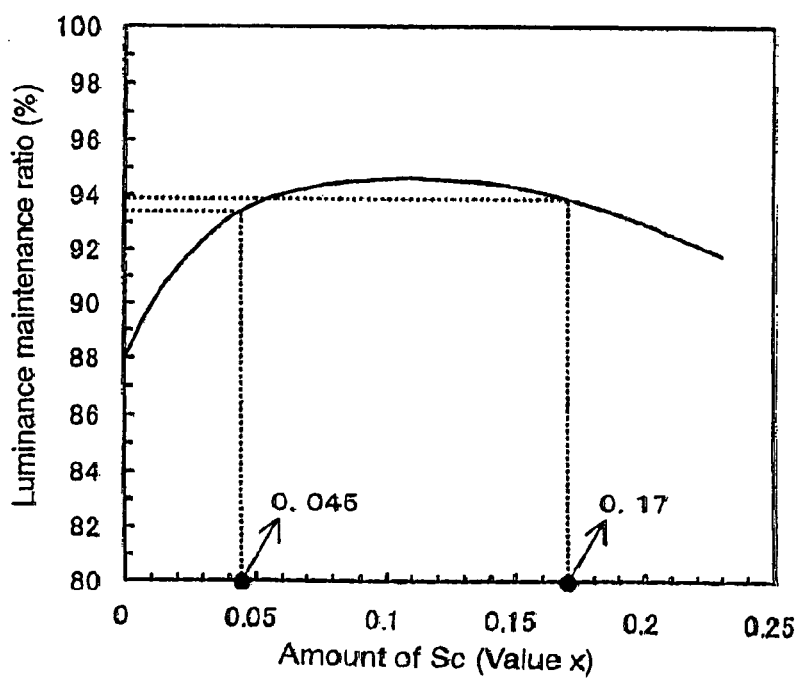
FIG. 2 is a graph showing the relation between a luminance maintenance ratio (%) and the amount of Sc (value x)

FIG. 2 shows the relation between a luminance maintenance ratio (%) and the amount of Se (value x) as the life of the phosphor $(Y_{0.91-x}, Sc_x, Tb_{0.09})_2SiO_5$ according to the embodiments of the present invention. The life characteristic is measured by irradiating a phosphor, which is employed in a projection cathode-ray tube produced for measurement, with an electron beam at an acceleration voltage of 32 kV and a current density of 50 μA/cm² for 10 hours. The luminance maintenance ratio (%) is the percentage of the value that is obtained by dividing the luminance after irradiation of electron beam for 10 hours by initial luminance. This figure shows that the luminance maintenance ratio is also preferable in the range where the amount of Sc (value x) is 0.045<x<0.17. In this case, though the case where the amount of Tb (value y) is 0.09 is shown, similar results are obtained in the cases other than this value. In the case where the value y is $0.05 \leq y \leq 0.117$, both the luminance and the luminance maintenance ratio are high in the range 0.045<x<0.17.

In the yttrium silicate phosphor according to the embodiments of the present invention, the phosphor exhibits a very excellent temperature characteristic in the range where the amount of Sc (value x) is 0.045<x<0.7, especially 0.07<x<0.13. In addition, the phosphor also exhibits an excellent life characteristic in this range. According to the present invention, a long-life phosphor with less aging in luminance and less luminance reduction even in high temperature can be obtained, thus, it is very useful as a phosphor for projection cathode-ray tubes.

Figure 3:
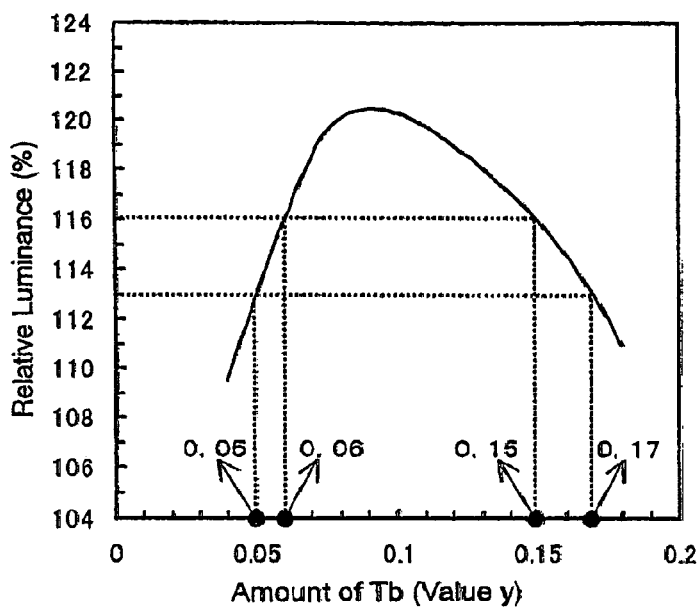
FIG. 3 is a graph showing the relation between relative luminance (%) and the amount of Tb (value y)

FIG. 3 shows the relation between relative luminance (%) and the amount of Tb (value y) of a phosphor $(Y_{0.91-y}, Sc_{0.09}, Tb_y)_2SiO_5$ according to the embodiments of the present invention. The relative luminance (%) is calculated as a relative value based on the luminance that is measured by irradiating a phosphor with an electron beam at an acceleration voltage of 10 kV and a current density of 0.5 μA/cm² where the luminance of a phosphor according to a comparative example 1 is defined as 100%. This figure shows that the luminance is improved to 113.0% or more in the range where the amount of Tb (value y) is $0.05 \leq y \leq 0.17$, especially it is remarkably improved to 116.0%. in the range $0.06 \leq y \leq 0.15$. In this case, though the case where the amount of Sc (value x) is 0.09 is shown, similar results are obtained in the cases other than this value.

As mentioned above, a phosphor with high luminance, and excellent temperature and life characteristics can be obtained in the range where the amount of Sc (value x) is 0.045<x<0.17, and the amount of Tb (value y) is $0.05 \leq y \leq 0.17$.

EXAMPLES

Example 1

First, a coprecipitated rare earth oxide and a silicon dioxide were measured as raw materials so that their moles are equal as follows.

$(Y_{0.887}, S_{0.048}, Tb_{0.085})_2O_3$ ... 100 g $SiO_2$ ... 26.1 g

These were mixed by a ball mill in a ceramic pot. The mixed materials were filled in an alumina crucible, and were burned at 1580° C. for 4 hours in nitrogen atmosphere containing 3% by volume of hydrogen gas. After the burned materials were dispersed by a wet process, they were separated and dried. Finally, the yttrium silicate phosphor having the general formula $(Y_{0.887}, Sc_{0.048}, Tb_{0.065})_2SiO_5$ according to the embodiment of the present invention was obtained.

Examples 2–6

Yttrium silicate phosphors having the general formulas shown in Table 1 according to the embodiments of the present invention were obtained by a process similar to the example 1 except using coprecipitated rare earth oxides shown in the Table 1 as raw materials.

Comparative Example 1

First, a coprecipitated rare earth oxide and a silicon dioxide are measured as raw materials so that their moles are equal as follows.

$(Y_{0.934}, Tb_{0.066})_2O_3$ ... 100 g $SiO_2$ ... 25.6 g

These are mixed by a ball mill in a magnetic pot. The mixed materials are filled in an alumina crucible, and are burned at 1580° C. for 4 hours in nitrogen atmosphere containing 3% by volume of hydrogen gas. After the burned materials are dispersed by a wet process, they are separated and dried. Finally, the yttrium silicate phosphor having the general formula $(Y_{0.934}, Tb_{0.085})_2SiO_5$ is obtained.

Comparative Example 2

Yttrium silicate phosphors having the general formulas shown in Table 1 are obtained by a process similar to the comparative example 1 except using coprecipitated rare earth oxides shown in the Table 1 as raw materials.

TABLE 1

|  | Coprecipitated Rare Earth Oxide | Yttrium Silicate Phosphor |
|---|---|---|
| Example 1 | $(Y_{0.887}, Sc_{0.048}, Tb_{0.065})_2O_3$ | $(Y_{0.887}, Sc_{0.048}, Tb_{0.065})_2SiO_5$ |
| Example 2 | $(Y_{0.852}, Sc_{0.083}, Tb_{0.065})_2O_3$ | $(Y_{0.852}, Sc_{0.083}, Tb_{0.065})_2SiO_5$ |
| Example 3 | $(Y_{0.768}, Sc_{0.166}, Tb_{0.066})_2O_3$ | $(Y_{0.768}, Sc_{0.166}, Tb_{0.066})_2SiO_5$ |
| Example 4 | $(Y_{0.862}, Sc_{0.047}, Tb_{0.091})_2O_3$ | $(Y_{0.862}, Sc_{0.047}, Tb_{0.091})_2SiO_5$ |
| Example 5 | $(Y_{0.822}, Sc_{0.088}, Tb_{0.090})_2O_3$ | $(Y_{0.822}, Sc_{0.088}, Tb_{0.090})_2SiO_5$ |
| Example 6 | $(Y_{0.743}, Sc_{0.166}, Tb_{0.091})_2O_3$ | $(Y_{0.743}, Sc_{0.166}, Tb_{0.091})_2SiO_5$ |
| Comp. Ex. 1 | $(Y_{0.934}, Tb_{0.066})_2O_3$ | $(Y_{0.934}, Tb_{0.066})_2SiO_5$ |
| Comp. Ex. 2 | $(Y_{0.926}, Sc_{0.008}, Tb_{0.066})_2O_3$ | $(Y_{0.926}, Sc_{0.008}, Tb_{0.066})_2SiO_5$ |
| Comp. Ex. 3 | $(Y_{0.917}, Sc_{0.017}, Tb_{0.066})_2O_3$ | $(Y_{0.917}, Sc_{0.017}, Tb_{0.066})_2SiO_5$ |
| Comp. Ex. 4 | $(Y_{0.908}, Tb_{0.092})_2O_3$ | $(Y_{0.908}, Tb_{0.092})_2SiO_5$ |
| Comp. Ex. 5 | $(Y_{0.901}, Sc_{0.008}, Tb_{0.091})_2O_3$ | $(Y_{0.901}, Sc_{0.008}, Tb_{0.091})_2SiO_5$ |
| Comp. Ex. 6 | $(Y_{0.892}, Sc_{0.016}, Tb_{0.092})_2O_3$ | $(Y_{0.892}, Sc_{0.016}, Tb_{0.092})_2SiO_5$ |

Table 2 shows the results of the temperature and life characteristics of the yttrium silicate phosphors obtained by the examples 1 to 6 and the comparative examples 1 to 6 that are measured by the aforementioned method. This table shows that the phosphors according to the examples 1 to e of the present invention had good temperature and life characteristics as compared with the phosphors of the comparative examples 1 to 6. Accordingly, it is found that the phosphors according to the examples of the present invention had excellent characteristics as a phosphor for the projection cathode-ray tubes especially under high load conditions.

TABLE 2

|  | Temp. Characteristic (%) | Luminance Maintenance Ratio (%) |
|---|---|---|
| Example 1 | 98.7 | 93.7 |
| Example 2 | 98.5 | 94.5 |
| Example 3 | 98.5 | 94.0 |
| Example 4 | 98.1 | 93.5 |
| Example 5 | 99.4 | 94.5 |
| Example 6 | 98.2 | 94.0 |
| Comp. Ex. 1 | 94.5 | 90.0 |

TABLE 2-continued

| | Temp. Characteristic (%) | Luminance Maintenance Ratio (%) |
|---|---|---|
| Comp. Ex. 2 | 94.2 | 92.0 |
| Comp. Ex. 3 | 95.1 | 92.0 |
| Comp. Ex. 4 | 94.8 | 88.0 |
| Comp. Ex. 5 | 95.5 | 89.8 |
| Comp. Ex. 6 | 96.0 | 90.8 |

Example 7

Figure 4:
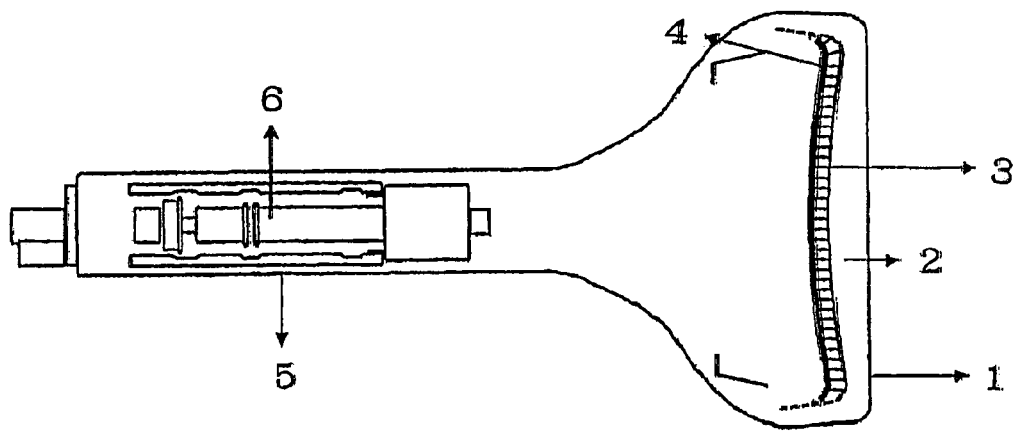
FIG. 4 is a cross-sectional view for explanation of a cathode-ray tube according to an embodiment of the present invention.
Figure 5:
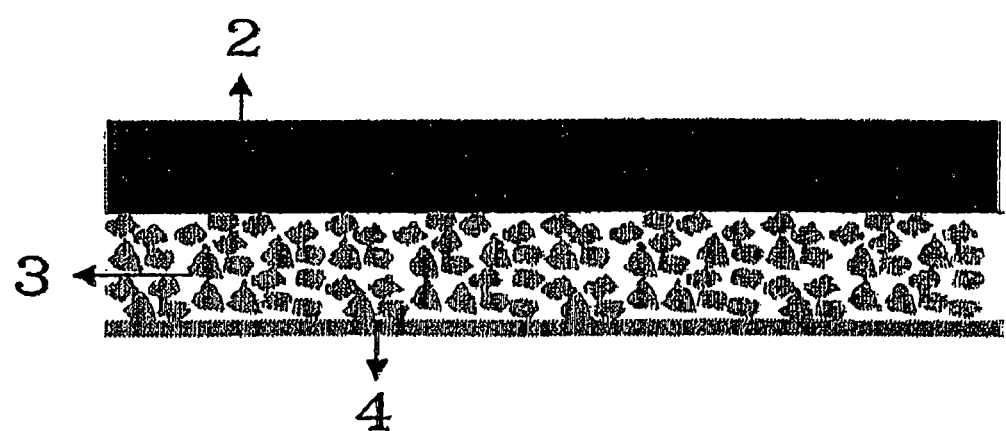
FIG. 5 is a partial cross-sectional showing a cathode ray tube face plate, a phosphor film, and an aluminum deposited film according to an embodiment of the present invention.

A phosphor film composed of the phosphor of the example 1 was formed on the interior surface of a face plate of a glass bulb of 18 cm (7 inches) so as to have 3.5 mg/cm$^2$ by sedimentation method. An aluminum deposited film was formed thereon. The bulb was provided with an electromagnetic focusing electron gun, and was vacuum-sealed. Thus, a projection cathode-ray tube was produced. FIG. 4 shows a cross-sectional view of this cathode-ray tube (projection cathode-ray tube). FIG. 5 shows a partial cross-sectional view of the cathode-ray tube face plate, the phosphor film, and the aluminum deposited film. As shown in FIG. 4, the phosphor film 3 was formed on the interior of the face plate 2 of the glass bulb 1 by applying the above phosphor, and the aluminum deposited film 4 was formed thereon. The electron gun 6 was located in a neck tube 5. In this projection cathode-ray tube an electron beam emitted from the electron gun 6 penetrated the aluminum deposited film 4 and excited the phosphor film 3, thus the phosphor was excited. As a result, the projection cathode-ray tube emitted luminescent radiation.

As mentioned above, a green emitting yttrium silicate phosphor according to the embodiments of the present invention comprises a composition having the general composition $(Y, Sc, Tb)_2SiO_5$ whose mole ratio of Sc to the entire rare-earth element in the phosphor is $0.045<S(Y+Sc+Tb)<0.17$, and thus has good temperature and life characteristics. A cathode-ray tube using the phosphor according to the embodiment of the present invention can display an image in high quality.

This application is based on application No. 2003-382765 filed in Japan on Nov. 12, 2003, the content of which is incorporated hereinto by reference.

What is claimed is:

1. A green emitting yttrium silicate phosphor comprising a composition having the general composition $(Y, Sc, Tb)_2SiO_5$, wherein the mole ratio of Sc to the entire rare-earth element in the phosphor is $0.10<Sc/(Y+Sc+Tb)<0.17$, and wherein the phosphor is excitable by an electron beam for a projection cathode-ray tube.

2. The green emitting yttrium silicate phosphor according to claim 1, wherein the mole ratio of Sc to the entire rare-earth element in the phosphor is $0.10<Sc/(Y+Sc+Tb)<0.13$.

3. The green emitting yttrium silicate phosphor according to claim 1, wherein the general formula is represented as follows:

$(Y_{1-x-y},Sc_x,Tb_y)_2SiO_5$, wherein $0.10<x<0.17$ and $0.05<y<0.17$.

4. The green emitting yttrium silicate phosphor according to claim 3, wherein $0.06<y<0.15$.

5. The green emitting yttrium silicate phosphor according to claim 3, wherein $0.10<x<0.13$.

6. The green emitting yttrium silicate phosphor according to claim 1, wherein the phosphor contains 1000 ppm or less of Ge in the phosphor.

7. A projection cathode-ray tube comprising a phosphor film, and an exciting device which irradiates the phosphor film with an electron beam, wherein the phosphor film comprises a green emitting yttrium silicate phosphor having the general composition $(Y, Sc, Tb)_2SiO_5$, and wherein the mole ratio of Sc to the entire rare-earth element in the phosphor is $0.10<Sc/(Y+Sc+Tb)<0.17$.

8. The cathode-ray tube according to claim 7, wherein the mole ratio of Sc to the entire rare-earth element in the phosphor is $0.10<Sc/(Y+Sc+Tb)<0.13$.

9. The cathode-ray tube according to claim 7, wherein the general formula is represented as follows $(Y_{1-x-y},Sc_x,Tb_y)_2SiO5$, wherein $0.10<x<0.17$ and $0.05<y<0.17$.

10. The cathode-ray tube according to claim 9, wherein $0.06<y<0.15$.

11. The cathode-ray tube according to claim 9, wherein $0.10<x<0.13$.

12. The cathode-ray tube according to claim 7, wherein the phosphor contains 1000 ppm or less of Ge in the phosphor.

* * * * *